United States Patent [19]

Johnson et al.

[11] Patent Number: 5,073,010
[45] Date of Patent: Dec. 17, 1991

[54] OPTICALLY ADDRESSABLE SPATIAL LIGHT MODULATOR HAVING A DISTORTED HELIX FERROELECTRIC LIQUID CRYSTAL MEMBER

[75] Inventors: Kristina M. Johnson; Chongchang Mao; Ibrahim S. Abdulhalim, all of Boulder, Colo.

[73] Assignee: University of Colorado Foundation, Inc., Boulder, Colo.

[21] Appl. No.: 522,609

[22] Filed: May 11, 1990

[51] Int. Cl.$^5$ ................................................ G02F 1/13
[52] U.S. Cl. ...................................... 359/72; 359/56; 359/36
[58] Field of Search ................ 350/339 R, 342, 351, 350/350 S, 333, 331 R, 360, 356, 338, 357, 334

[56] References Cited

U.S. PATENT DOCUMENTS

| | | | |
|---|---|---|---|
| 3,824,002 | 7/1974 | Beard | 350/342 |
| 4,367,924 | 1/1983 | Clark et al. | 350/334 |
| 4,538,884 | 9/1985 | Masaki | 350/342 |
| 4,679,910 | 7/1987 | Efron et al. | 350/342 |
| 4,693,561 | 9/1987 | Ashley | 350/342 |
| 4,767,192 | 8/1988 | Chang et al. | 350/342 |
| 4,908,584 | 3/1990 | Reichman | 350/340 |
| 4,925,276 | 5/1990 | McMurray, Jr. et al. | 350/334 |
| 4,941,735 | 7/1990 | Moddel et al. | 350/342 |

OTHER PUBLICATIONS

"Fast Responding and Highly Multiplexible Distorted Helix Ferroelectric Liquid-Crystal Displays", by J. Funischilling & M. Schadt, *American Institute of Physics*, 15 Oct. 1989, pp. 3877-3882.

"Amorphous Silicon Photoconductor in a Liquid Crystal Spatial Light Modulator", by Paul R. Ashley & Jack H. Davis, Applied Optics, 15 Jan. 87, pp. 241-246.

"High-Speed Light Valve Using an Amorphous Silicon Photosensor and Ferroelectric Liquid Crystals," by Takahashi, Asada, Miyahara, and Kurita, *Applied Physics Letters*, Oct. 19, 87, pp. 1233-1235.

"Photoaddressing of High Speed Liquid Crystal Spatial Light Modulators", by Moddel, Johnson, and Handschy, *Proceedings of SPIE*, 13-15 Jan. '87, vol. 754, pp. 207-213.

Primary Examiner—Rolf Hille
Assistant Examiner—Minhloan Tran
Attorney, Agent, or Firm—Francis A. Sirr; Earl C. Hancock

[57] ABSTRACT

The disclosure describes an optically addressable spatial light modulator (OASLM) having a light sensitive member and a distorted helix ferroelectric liquid crystal (DHFLC). In a first embodiment a hydrogenated amorphous silicon (a-Si:H) photodiode layer is in physical contact with the DHFLC layer. In another embodiment an integrated circuit member includes a photosensitive area and an associated metal pad for each OASLM pixel, the metal pads in physical contact with corresponding DHFLC pixel areas. In the first embodiment, a low magnitude AC voltage (less than three to seven volts peak to peak) is connected to the OASLM as operating voltage, preferably in the absence of a DC offset voltage. The OASLM pixel areas of the OASLM are selectively addressed by a writing light wavefront, to thereby activate corresponding pixel areas of the light sensitive member. The voltage/current that is photogenerated in the activated pixels of the photosensitive member cause a current to flow, activating the corresponding DHFLC pixel areas. In an alternate construction of the first embodiment, the OASLM includes an external diode connected thereacross, this diode being operable to dissipate internal charge that may build up in the DHFLC. Reading of the activated DHFLC pixel areas of the DHFLC may be by way of a transmission or a reflection mode.

37 Claims, 4 Drawing Sheets

OPTICALLY ADDRESSABLE SPATIAL LIGHT MODULATOR HAVING A DISTORTED HELIX FERROELECTRIC LIQUID CRYSTAL MEMBER

FIELD OF THE INVENTION

This invention relates to the field of optical systems and elements, and more specifically to optically addressable spatial light modulators (OASLMs) incorporating a birefringent distorted helix ferroelectric liquid crystal (DHFLC).

BACKGROUND OF THE INVENTION

Optically addressable spatial light modulators (SLM, SLMs, OASLM or OASLMs), as the term is used herein, are optical masks having one or more small picture elements, PELS or pixel areas that are individually and selectively switchable or writeable by the operation of one or more writing light beams or illumination. The modulator's pixel areas that have been selectively written (i.e. data has been stored therein) are then used to modulate a reading optical wavefront. In some cases, the writing wavefront and the reading wavefront may comprise a common illumination source.

Modulators of this type may be classified as intensity modulators, phase modulators, or polarization modulators.

These modulators may operate either in a transmission mode or a reflection mode. In the transmission mode of operation the writing wavefront and the reading wavefront may comprise the same wavefront, or may comprise two different wavefronts. In the reflective mode of operation the writing wavefront and the reading wavefront usually comprise two different wavefronts.

These modulators are usually two dimensional, and may comprise, for example, an X-Y coordinate system array or matrix of a plurality of small pixel areas. Modulators of this type may be arranged in a two or a three dimensional matrix of pixel rows and pixel columns.

In an OASLM, one or more write beams, for example white light or a visible laser light, programs or activates the individual pixels of the SLM so that the activated pixels subsequently operate to rotate the polarization of a read beam wavefront, for example an reading infrared laser beam. In this way the write beam programs the SLM by activating only selected photosensitive and liquid crystal pixel areas of the SLM.

U.S. Pat. No. 4,538,884 is an example of such an SLM. In the device of this patent, a pair of glass plates 1a and 2a support a pair of transparent electrodes 2a and 2b having a external source of voltage (not shown) applied thereto. A photoconductive layer 9, which can be amorphous silicon, is supported on electrode layer 2b. A plurality of aluminum reflectors 8 are incorporated into a transparent insulating layer 7 and are supported on the surface of the photoconductive layer, with the reflectors directly adjacent to the photoconductive layer. An apertured shading layer 5 of carbon or metal is carried on the transparent insulating layer, each aperture 6 facing one of the reflectors. The space intermediate transparent insulating layer 7 and transparent electrode 2a is occupied by a liquid crystal 3.

The types of known liquid crystals include nematic liquid crystals, cholestic liquid crystals, smectic liquid crystals, and chiral smectic liquid crystals, of which electroclinic smectic A and ferroelectric smectic C are two examples.

The liquid crystal material useful in the practice of the present invention is chiral smectic liquid crystal material of the distorted helix ferroelectric liquid crystal (DHFLC) type. The publication *American Institute of Physics*, the article entitled "Fast Responding and highly Multiplexible Distorted Helix Ferroelectric Liquid-Crystal Displays", 15 October 1989, at pages 3877 to 3882 is cited for its discussion of a liquid crystal display using a DHFLC member. It is important to note that the device of this publication is electrically addressed, rather than being optically addressed as in the present invention.

Smectic C and H ferroelectric liquid crystals are described in U.S. Pat. No. 4,367,924. This patent, however, does not describe DHFLCs, nor the unique phenomenon thereof whereby the application of an electrical field operates to change the birefringence of the DHFLC material.

A preferred light sensitive member useful in one embodiment of the present invention, but without limitation thereto, is a hydrogenated amorphous silicon (a-Si:H) photodiode layer.

The use of amorphous silicon photoconductor means (as is to be distinguished from the present invention's photodiode means) in a nematic liquid crystal SLM (as is to be distinguished from the present invention's DHFLC) is suggested in the article "Amorphous Silicon Photoconductor in a Liquid Crystal Spatial Light Modulator", by Paul R. Ashley and Jack H. Davis, *APPLIED OPTICS*, 15 January 1987, Vol. 26, No. 2, at pages 241-246.

The use of amorphous silicon photoconductor means and ferroelectric liquid crystal means with an intermediately located aluminum layer, to thereby form a single element light valve (i.e. not a pixelated device as in the present invention), is suggested in the article "High-speed Light Valve Using an Amorphous Silicon Photosensor and Ferroelectric Liquid Crystals", by N. Takahashi, H. Asada, M. Miyahara and S. Kurita, *APPLIED PHYSICS LETTERS*, Vol. 51, No. 16, 19 October 1987, at pages 1233-1235. The light valve of this article does not relate to the use of a DHFLC in a pixelated OASLM having photodiode type photosensitive member, as is described herein.

The basic configuration of an OASLM having an a-Si:H photodiode layer and a ferroelectric liquid crystal layer is taught by the article entitled "Optical and Digital Pattern Recognition", authored by G. Moddel, K. M. Johnson and M. A. Handschy, in the publication *Proceedings of SPIE - The International Society for Optical Engineering*, volume 754, 13-15 January 1987 at pages 207-213. This article does not describe the use of a DHFLC in a OASLM, and more particularly this article does not teach an OASLM having a DHFLC that is activated by a photodiode layer and powered by a low magnitude AC source of operating voltage, to thereby provide optical modulation of the chiral smectic liquid crystal's birefringence characteristic.

This article is of interest in that it recognizes the effect that voltages of opposite polarity have on an OASLM having an a-Si:H photodiode layer. As described in this article, in the dark (i.e. in the absence of writing illumination) the reverse biased photodiode layer passes very little current, so the reverse bias voltage is then dropped across the photodiode layer. However, when the reverse biased photodiode layer is illuminated, the photodiode layer produces a current which charges the liquid crystal layer, to thus switch pixel portions of the liquid crystal layer to the ON state. The liquid crystal layer is thereafter switched OFF by reversing the polarity of the applied bias. Under the influence of this reverse polarity, this reverse polarity voltage is dropped across the liquid crystal layer, and all pixels of the liquid crystal layer that are in an ON state are then switched OFF. The pixels that are in the OFF state remain in the OFF state.

The broad idea of using an AC source to power a liquid crystal light valve is taught by U.S. Pat. No. 3,824,002. In this connection U.S. Pat. No. 4,679,910 may also be of general interest.

While prior art OASLMs have been generally acceptable for their intended purposes, they fail to provide a low voltage OASLM, a high speed OASLM, a high resolution OASLM, analog switching of the OASLM's liquid crystal, a controllable liquid crystal birefringence characteristic as a function of the applied electric field, and the low cost OASLM that is provided by the present invention which utilizes a DHFLC. The prior art also fails to provide an OASLM with a DHFLC whose birefringence is controllable, and which provides analog or multistable switching of a DHFLC layer in an OASLM.

SUMMARY OF THE INVENTION

This invention relates to a light sensitive device that uses a liquid crystal element to modulate a reading light wavefront in response to the device having been written by a writing light source or wavefront. The reading wavefront may be transmitted through the device, or alternatively the reading wavefront may be reflected by the device. That is, this invention relates to liquid crystal type optically addressable spatial light modulators (OASLMs).

A wide range of applications exist for the device of this invention, including use as image amplifiers, as input/output displays, as spatial filters, as optical crossbar switches, as optical correlators, as incoherent-to-coherent converters, as infrared-to-visible converters, as color or pseudocolor modulators, as optical crossbar switches, etc..

The device of this invention differs from prior art devices of this general type in that it provides for use of a particular class of liquid crystal member, namely a distorted helix ferroelectric liquid crystal (DHFLC). The variable, voltage controllable, birefringence that is provided by the DHFLC allows an OASLM, having a photosensor and a ferroelectric liquid crystal, to modulate the wavelength (i.e. the color) of the reading illumination, in addition to controlling the intensity, phase and polarization of the reading illumination.

In one embodiment of the invention, the DHFLC is selectively activated by the use of a particular class of light sensitive member, i.e. a hydrogenated amorphous silicon (a-Si:H) photodiode light sensitive member. Devices in accordance with this embodiment of the invention include a DHFLC, a low magnitude AC power source (i.e. a peak to peak magnitude of about three to seven volts or less), preferably in the absence of a source of DC offset voltage.

As a feature of this embodiment of the invention, a diode is connected to shunt the modulator, the connection polarity of the diode being opposite to the polarity of the modulator's internal photodiode light sensitive member. This external diode effectively shunts the modulator's internal series circuit comprising the photodiode light sensitive member and the DHFLC. This external diode provides a current leakage path for any charge buildup that may occur within the DHFLC. Such a charge buildup is also inhibited by the invention's use of an AC power supply in the absence of a DC offset voltage source. However, the use of such an external diode may be preferred even when such a power supply scheme is in use.

In this embodiment of the invention, the entire multi-pixel area of the OASLM may be covered by an internally located light sensitive layer, such that selective write activation of pixel areas within this light sensitive layer operates to activate only corresponding pixel areas of the DHFLC (i.e. the corresponding liquid crystal pixel area undergoes helix unwinding). This light sensitive layer is preferably a hydrogenated amorphous silicon (a-Si:H) photodiode layer, and the liquid crystal layer is preferably a distorted helix ferroelectric liquid crystal (DHFLC) layer operating in a non-bistable mode.

The external surfaces of the DHFLC layer of the invention may be formed to have a built-in crystal molecular orientation. That is, the crystal layer surfaces preferentially align to one crystal orientation. This is accomplished by providing alignment layers on the two surfaces that confront the liquid crystal layer.

In an another embodiment of the invention the internally located light sensitive layer comprises an integrated circuit substrate member that covers the entire multi-pixel area of the OASLM. The integrated circuit member includes a discrete photosensitive area and a positionally associate metal crystal modulating pad for each pixel of the OASLM. The metal pads are located in physical contact with corresponding pixel areas of the DHFLC. This plurality of individual light sensitive and metal pad pairs are arranged in the physical form of the modulator's pixel matrix, one such pair being provided for each modulator pixel. In this way, the electrical output of each light sensitive area is connected to a corresponding pixel area of the DHFLC, to thereby effect selective pixel switching of the DHFLC as the light sensitive areas are selectively activated by a writing light source.

The low voltage modulator of this invention is compatible with the output signal levels of semiconductor circuit elements such as CMOS. In addition, this modulator provides an analog transfer function relationship between the magnitude of the modulator's writing illumination and the change in birefringence and polarization rotation that is produced in a reading wavefront. This analog result occurs because the modulator's DHFLC layer undergoes nearly linear helix unwinding. At the same time, the optical axis of the DHFLC rotates between plus and minus 30 degrees with application of two polarities of electric field, as is provided by the AC source of operation voltage. As a result, linear grey level operation is possible with the modulator of this invention.

These and other objects and advantages of the invention will be apparent to those of skill in the art upon reference to the following detailed description of embodiments of the invention, which description makes reference to the drawing.

DETAILED DESCRIPTION OF THE INVENTION

This invention relates to a new and unusual type of optically addressed spatial light modulator comprising a photosensor and a distorted helix ferroelectric liquid crystal (DHFLC).

Without limitation thereto, a liquid crystal material that has been found to have utility in the practice of the invention is the brand FLC-6200 material manufactured by the Hoffman-La Roche, and the brand CS-1017 manufactured by Chisso. The helix unwinding voltage of this liquid crystal material is about plus or minus 2.5 volts per micro meter. This liquid crystal material has a pitch that is much shorter than the wavelength of the light source that is used to read the OASLM, for example a He-Ne laser. As a result, the short pitch of the liquid crystal layer reduces the scattering of the He-Ne laser beam, and as a result the contrast ratio of the OASLM is maximized.

Figure 1:
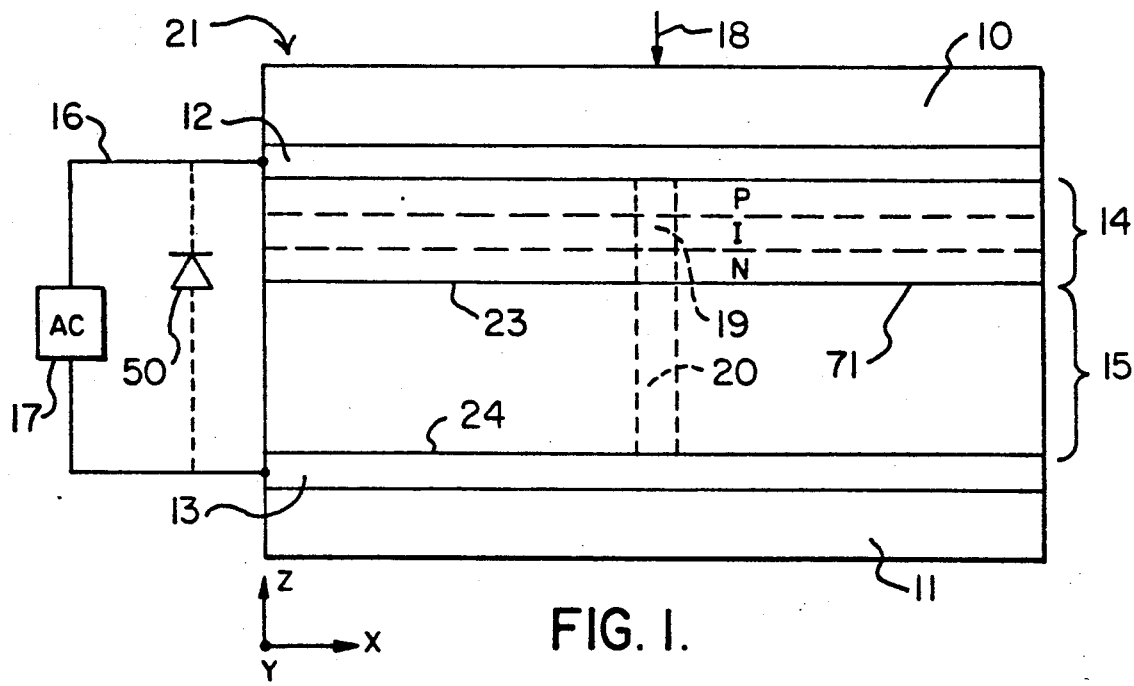
FIG. 1 is a side section view of a portion of an OASLM in accordance with the invention wherein the light sensitive member comprises a continuous hydrogenated amorphous silicon (a-Si:H) photodiode layer that is in physical contact with the continuous DHFLC layer, for example, a multi-pixel portion of a transmission mode OASLM matrix or array, this figure also showing a feature of the invention whereby an external diode is connected to shunt the OASLM.
Figure 2:
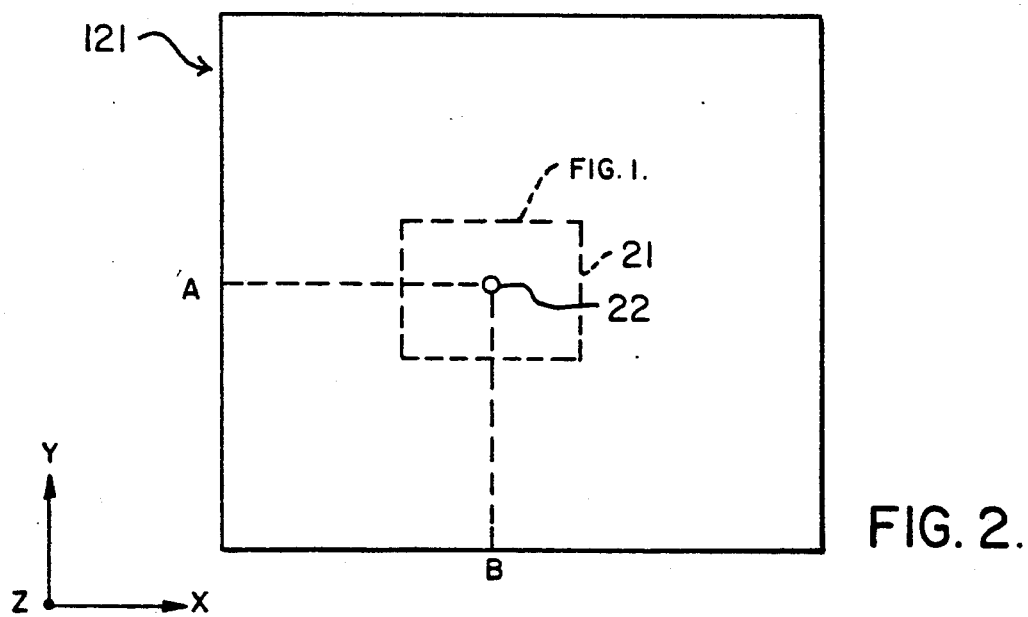
FIG. 2 is a top plan view of a relatively large two dimensional, X-Y coordinate system, OASLM array constructed as shown in FIG. 1, and showing an exemplary physical location of the smaller multi-pixel portion of FIG. 1 within this large array.

This type of liquid crystal uses short pitch mixtures, the surface interactions of which are weak, i.e. just strong enough to generate the so-called bookshelf structure, where the smectic planes of the liquid crystal are oriented perpendicular to the glass plates of the OASLM (i.e. the Z direction of FIGS. 1 and 2). This type of liquid crystal provides linear response to the writing radiation source, and the liquid crystal exhibits no bistability unless it is driven by a voltage that is greater than its unwinding voltage. As a consequence, this liquid crystal material exhibits good grey scale images when the applied supply voltage is maintained below the material's helix unwinding or saturation voltage.

The use of such a liquid crystal provides various new, unusual and unexpected modulator features, including the ability to use a low magnitude AC driving voltage (i.e. a peak to peak magnitude of generally less than 3 to 7 volts), a high contrast ratio and throughput is provided due to the large tilt angle of the optical axis (i.e. a contrast ratio generally greater than 50 to 1), high resolution (i.e. a resolution generally greater than 45 line pairs per millimeter), linear grey level operation, the possibility of operating with saturating characteristics, and variable birefringence.

In the present invention, the modulator operates in an analog manner when powered by an AC voltage source of less than about three to seven volts peak to peak. No series connected DC offset voltage is provided in this power source. This aspect is of the invention is important in that low voltage modulators that are powered by a voltage source having zero DC offset provide a much longer lifetime, as the modulator will not degrade due to electrolytic effects within the liquid crystal layer.

Within the spirit and scope of the invention, any type of light sensitive layer could be substituted for the preferred hydrogenated amorphous silicon photodiode layer, to enable the addressing of the modulator.

In one embodiment of the invention, and with reference to FIG. 1, but without limitation thereto, a modulator 21 in accordance with the invention was constructed using an a-Si:H, P-I-N, photodiode layer 14 that was about 2 micro meters thick in its intrinsic region (i.e. the layer's I region). This light sensitive layer was deposited on an optical flat 10 that had previously been coated with a transparent and conductive oxide (TCO) layer 12. The exposed surface 23 of the N layer was then covered by an alignment layer, which alignment layer was then brush rubbed. A preferred alignment material is polybutylene teraphthalate (PBT). Other alignment materials, such as polyvinyl alcohol, silicon monoxide (SiO), silicon dioxide ($SiO_2$), and Langmuir-Blodgett films are also suitable.

A distorted helix ferroelectric liquid crystal layer 15 (FLC-6200) was then placed between the a-Si:H layer and a second optical flat 11 that had previously been coated with a transparent and conductive indium oxide (ITO) layer 13 whose surface 24 had also been coated with an alignment layer.

A 3 to 7 volt peak to peak AC voltage 17 was applied to the two conductive layers 12,13. During the negative half cycle of the applied AC electrical waveform (i.e. when conductive layer 12 is negative), P-I-N photodiode layer 14 is reverse biased. When write radiation or light 18 now shines on modulator 21, current flows, and supply voltage 17 is dropped across liquid crystal layer 15. This voltage distorts the layer's helix, thus changing the birefringence of liquid crystal material 15, and rotating the molecular director or optic axis of the liquid crystal.

During the positive part of the AC waveform (i.e. when layer 12 is positive), P-I-N photodiode 14 is forward biased. Thus during this half cycle of AC source 17 a positive voltage is placed across liquid crystal layer 15. This voltage rotates the liquid crystal molecular director or optic axis in the opposite direction, and also distorts the helix.

Modulator 21 thus operates as a programmable optically addressable spatial light modulator.

When the above structure was modified by connecting a DC bias source (not shown) in series with AC supply voltage source 17, after a relatively short period of operation (i.e. about 5 minutes) modulator 21 failed to operate in that the write data pattern could not be switched off of modulator 21 when conductor 12 was positive, as above described. This means that with a DC bias, the modulator acts as a permanent, nonvolatile, memory.

An external diode 50 (shown dotted in FIGS. 1 and 3) may be placed in parallel with the internal series circuit that is made up of a-Si:H photodiode layer 14 and liquid crystal 15. This diode operates to increase the lifetime of modulator 21 since the modulator will not degrade due to electrolytic effects that may build up within liquid crystal layer 15 due to extended use. As a result, a writing data pattern can be switched on and off rapidly (less than 100 micro seconds was measured).

In the FIG. 1 embodiment of the invention, information or data is optically stored in a transmission mode OASLM 21 by the operation of a writing electromagnetic radiation beam or beams 18. This data is optically readout by the use of a reading electromagnetic radiation wavefront (not shown) that impinges upon modulator 21 from either the top (as shown in FIG. 1) or the bottom thereof and is transmitted through the OASLM.

More specifically, FIG. 1 is a side section view of a small portion 21 of the relatively large OASLM 121 shown in FIG. 2 (a top plan view), both of which are constructed in accordance with the invention. For example, modulator 121 of FIG. 2 may comprise a 128×128 or a 1024×1024 pixel matrix.

Assume for the moment that write beam 18 operates to activate one individual pixel area 19,20 within the multi-pixel area of FIG. 1. This pixel area 19,20 is shown as pixel 22 in FIG. 2. The physical location of this individually activated pixel 22 is located at the intersection 22 of horizontal pixel row A and vertical pixel column B within the large X-Y coordinate system of OASLM 121.

With reference to FIG. 1, the entire multi-pixel planar area of FIGS. 1-2 is covered by a photodiode light sensitive layer or film 14, such that selective write activation of the pixel area 22 of FIG. 2 by writing light beam 18 causes a localized current to be generated in photodiode layer 14 only at the corresponding physical location 19 (FIG. 1) within layer 14.

The entire planar area of OASLM 21 is also covered by a liquid crystal layer or film 15. The localized current that is generated within photodiode layer 14 now allows an electrical current to flow through the power supply circuit means 16 that includes low voltage AC source 17, so as to cause only the corresponding pixel area 20 of the adjacent liquid crystal layer 15 to be activated.

The OASLM of FIGS. 1-2 includes two transparent glass sheets or flats 10 and 11 that are respectively coated with a layer of transparent electrically conducting oxide material 12 and 13. Light sensitive layer 14 and liquid crystal layer 15 are sandwiched between conducting layers 12 and 13. The surface of light sensitive layer 14 and the surface of indium oxide conducting layer 13 against which liquid crystal layer 15 abuts preferably include crystal alignment layers 23 and 24, as is well known by those skilled in the art.

Without limitation thereto, light sensitive layer 14 is preferably a hydrogenated amorphous silicon (a-Si:H) photodiode layer (shown schematically as a photodiode 30 in FIG. 3), and liquid crystal layer 15 is preferably a DHFLC layer (shown schematically as a capacitor 31 in FIG. 3) operating in its non-bistable mode. Exemplary thickness of photodiode layer 14 and liquid crystal layer 15 (where thickness is measured vertically in FIG. 1) are 1 micron and 1.8 microns, respectively, for a transmission mode OASLM. For a reflective mode OASLM, corresponding exemplary thickness would be 1 micron and 0.9 microns Preferably liquid crystal layer 15 is formed with a crystal alignment by the use of the above mentioned crystal alignment layers on the crystal abutting surfaces 23,24 of light sensitive layer 14 and conductive layer 13. That is, the external crystal surfaces preferentially align to one crystal orientation. When photodiode layer 14 is illuminated (i.e. when the OASLM is written) by write illumination source 18, the photodiode layer allows a current to flow through supply conductor 16 and AC source 17 to thereby charge corresponding portions of liquid crystal layer 15. The charging of these liquid crystal pixel portions rotates these portions into a different orientation, thus switching the liquid crystal layer from off to on, for example in a linear manner as a function of the magnitude of write illumination 18.

In the OASLM of FIG. 1, a continuous photodiode film 14 covers the entire X-Y pixel area of OASLM 21, and allows a writing wavefront or beam such as 18 to activate only selected pixel areas of the photodiode film, thus causing a current to flow only in those selected pixel areas of the photodiode film, and thereby causing the adjacent liquid crystal film 15 to switch only in its corresponding pixel portions. In this current flow circuit a voltage drop of about 0.7 volts occurs across photodiode portion 19, and the remaining portion of source 17 is dropped across liquid crystal portion 20.

Preferably liquid crystal layer 15 of FIG. 1 acts as an addressable half wave plate for the reading illumination. As is well known, in a transmission mode device, the reading illumination makes one pass thought liquid crystal layer 15, whereas in a reflective mode device the reading illumination makes two passes through liquid crystal layer 15, one pass being the initial entering pass and the other pass being the reflected exiting pass.

The operation of DHFLC 15 provides a change in the birefringence of the liquid crystal layer as a function of writing illumination intensity, such that a color display may be provided when the OASLM is read using white light. Single wavelength light can be used to write photosensor 14 of the OASLM, while white reading light, which contains many wavelengths, can be used to read the OASLM, thus providing a color display due to the variation of the DHFLC's birefringence characteristic that occurs with variation in the intensity of writing light 18.

When appropriately oriented, liquid crystal layer 15 rotates the polarization of a transmitted (or a reflected)

reading light wavefront (not shown) by an angle that is determined by the intensity of the incident writing illumination. Liquid crystal layer 15 thus operates to modulate the intensity, phase and polarization of the reading light wavefront. As is well known by those skilled in the art, OASLM 21 may be placed between polarizer elements (not shown).

In the transmission mode structure of FIGS. 1-2, no reflector is provided for the reading wavefront. Photodiode layer 14 is sufficiently thin to absorb at most only a fraction of the incident writing light 18. This absorption property of layer 14 may be controlled by controlling the doping of layer 14. The writing and reading radiation sources may have the same optical characteristics, in which case some of the writing light 18 must be absorbed in photodiode layer 14 in order to activate the photodiode layer. Alternatively, the writing and reading light sources may be distinct, in which case the reading light source may be of a wavelength such that virtually none of the reading light is absorbed in layer 14.

Preferably, but without limitation thereto, photodiode layer 14 comprises a a-Si:H based multi layer film, comprising a P-I-N layer of the type shown in FIG. 1. The P layer consists of boron doped a-Si:C:H. The I layer is undoped material. The N layer is phosphorous doped.

While FIG. 1 has been described with reference to a transmission mode OASLM, it will also operate as a reflective mode device since the OASLM's P-I-N photodiode layer 14 has a higher index of refraction that does DHFLC layer 15. As a result, fresnel reflection will occur at the interface 71 between of these two layers, as reading illumination is directed to the OASLM from the liquid crystal side of the OASLM.

Figure 7:
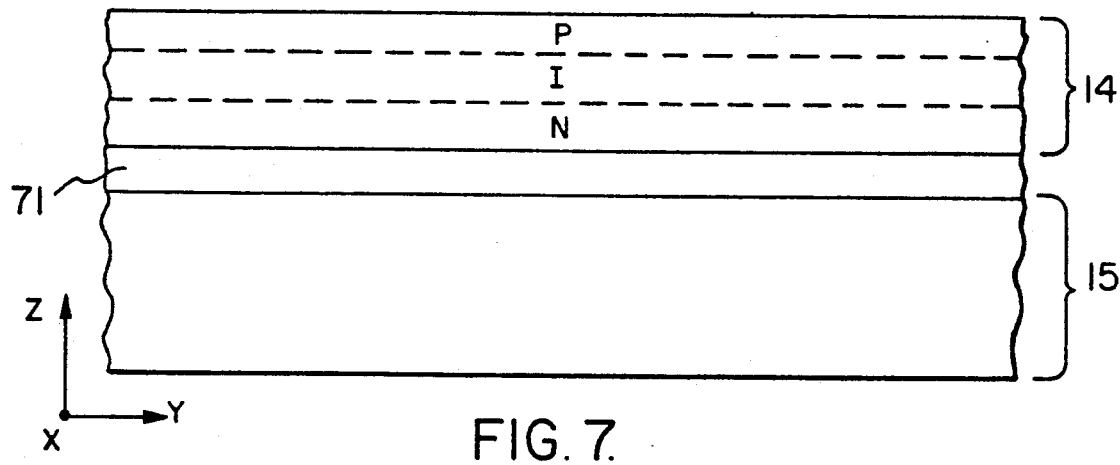
FIG. 7 is a side section view, much like FIG. 1, wherein a reflective mode OASLM is provided by the use of a dielectric mirror layer that is positioned intermediate the liquid crystal layer and the photodiode layer of FIG. 1, to thereby reflect a reading wavefront that impinges upon the OASLM from the liquid crystal side thereof.

Another way to fabricate a reflection mode device from the device of FIG. 1 is shown in FIG. 7. In this OASLM a dielectric mirror layer 71 (i.e. an electrically nonconductive mirror layer) is provided intermediate layers 14 and 15. This mirror layer operates to reflect the reading wavefront.

Figure 8:
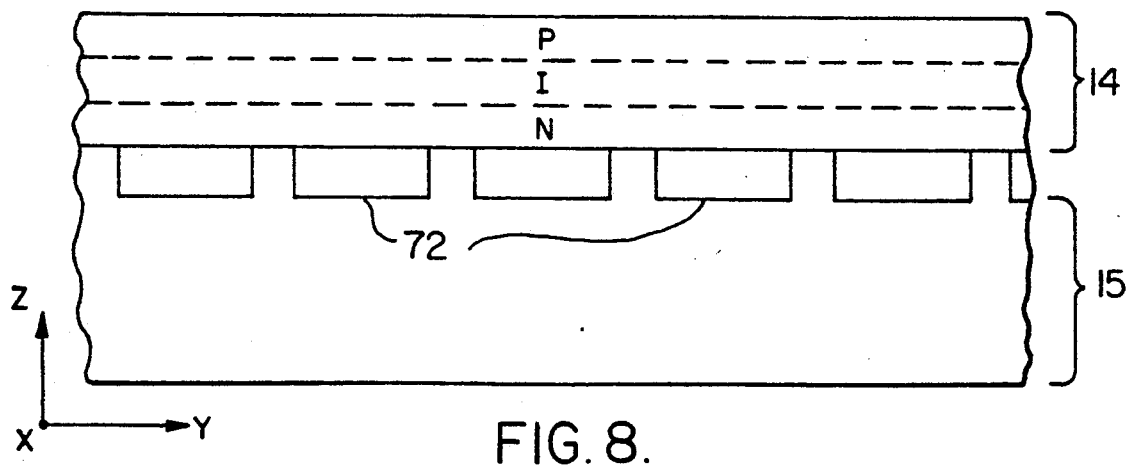
FIG. 8 is a side section view, much like FIG. 7, wherein a reflective mode OASLM is provided by the use of an X-Y pixel matrix pattern of individual, electrically conductive, metal mirror elements, one mirror element being provided for each pixel of the OASLM.

When a reflective mode OASLM is fabricated using an electrically conductive mirror means, as is shown in FIG. 8, the OASLM contains an X-Y planar matrix of individual metal mirror elements 72, one mirror element for each pixel of the OASLM.

Figure 9:
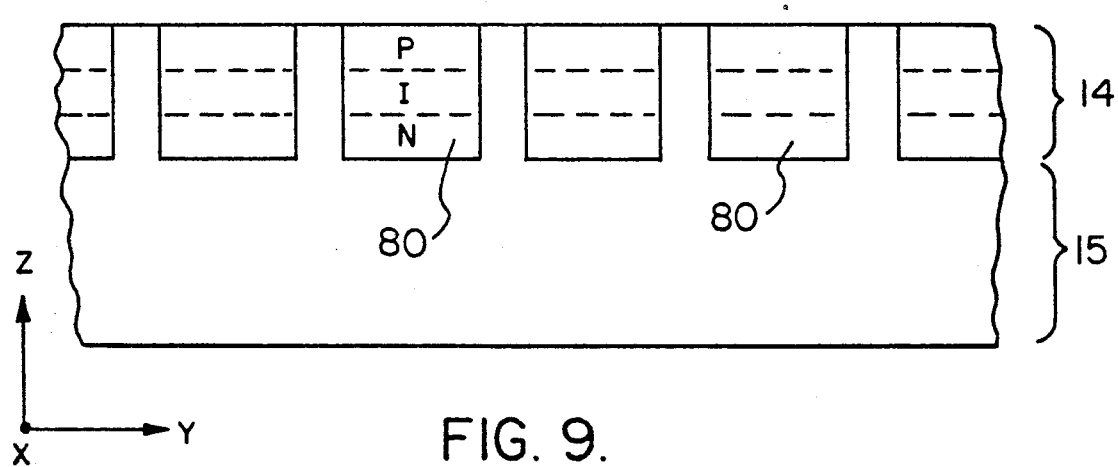
FIG. 9 is a side section view of an alternate form of the OASLM of FIG. 1 wherein the P-I-N photodiode layer thereof is modified to provide an X-Y pixel matrix pattern of individual P-I-N photodiode elements, one photodiode element being provided for each pixel of the OASLM.

In an alternate form of the OASLM of FIG. 1, shown in FIG. 9, P-I-N photodiode layer 14 is modified to provide an X-Y planar matrix of individual P-I-N photodiode elements 80, one photodiode element for each pixel of the OASLM.

Figure 3:
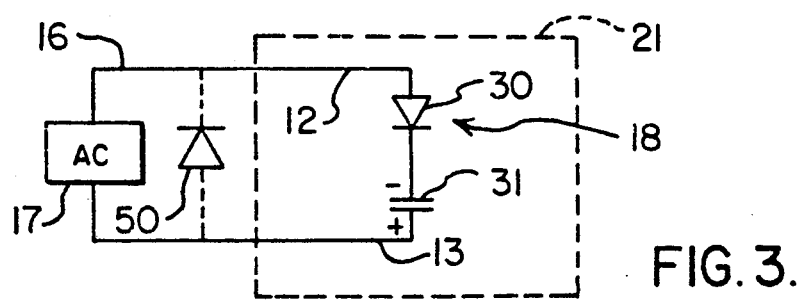
FIG. 3 is a simplified equivalent schematic circuit diagram of the device of FIG. 1.

The pixel portion 19 of photodiode layer 14 and the positionally corresponding pixel portion 20 of liquid crystal layer 15 of FIG. 1 can be electrically represented as the equivalent of a series connected photodiode and capacitor. With this in mind, FIG. 3 is a simplified equivalent schematic circuit diagram of the portions 19,20 of the OASLM of FIG. 1.

As seen from this figure, the P layer of photodiode layer 14 comprises the anode of photodiode 30. This anode is connected to a conductor 12, representing conductive layer 12 of FIG. 1. Likewise, the lower plate of capacitor 31, representing the lower surface of liquid crystal layer 15 of FIG. 1, is connected to a conductor 13, representing conductive layer 13 of FIG. 1.

As stated previously, in accordance with the invention, AC source of supply voltage 17 is of a low magnitude, and more specifically is of a magnitude that is less than about 3 to 7 volts peak to peak. The waveshape and periodicity of AC source 17 is not critical to the invention. For example, source 17 may operate at video frame rates. Without limitation thereto, source 17 is preferably a square wave source. One half cycle of source 17 comprises a write/read period for the modulator, whereas the other half cycle comprises the erase period for the modulator. A feature of the invention is that power circuit means 16 does not necessarily include a source of DC offset voltage.

During the write/read half cycle of AC source 17 conductor 12 is negative, and photodiode 30 is reverse biased. In the absence of write illumination 18, ideally all of supply voltage source 17 is dropped across photodiode 30. This half cycle comprises the active half cycle during which data may be stored in the pixel portion 19,20 of the OASLM. That is, the presence of write beam 18 during this half cycle causes a current to be generated by photodiode 30. As a result, current flows from AC supply 17, through photodiode 30, to charge capacitor 31. More specifically, capacitor 31 of FIG. 3 is charged such that its top plate assumes a negative polarity, and its bottom plate assumes a positive polarity, as is shown in FIG. 3. This is defined as the on or switched state of the liquid crystal pixel portion 20 of FIG. 1.

When a reading illumination wavefront is now incident upon the OASLM, for example a reflection mode device in which the reading wavefront is incident on the OASLM from the liquid crystal side thereof (i.e. the bottom side in FIG. 1), the reflected wavefront from the interface 23 of liquid crystal layer 15 and photodiode layer 14 undergoes a polarization change, as compared to the original state of the reading wavefront. The polarization change comprises the basic modulation principle of operation of the OASLM, although the phase modulation thereof could also be used.

During the other half cycle of AC source 17 conductor 12 is positive relative to conductor 13, and photodiode 30 is forward biased. This other half cycle operates to erase the pixel area that is represented by the equivalent circuit of FIG. 3. That is, during this half cycle, photodiode 30 is forward biased, and any charge on capacitor 31 (i.e. pixel portion 20 of FIG. 1) is now dissipated by way of the current that flows through AC source 17 and forward biased photodiode 30. As a result, the liquid crystal pixel portion is placed in its defined off state. The liquid crystal pixel portion assumes this off state independent of the presence or absence of write illumination 18.

As the pixel area 19,20 repeatedly cycles on and off as above described, charging and then discharging liquid crystal capacitor 31, it is possible that the liquid crystal's pixel area 20 may gradually accumulate a steady state quiescent charge as shown in FIG. 3. This effect is thought to be caused by impurities in the liquid crystal material, which impure materials are believed to ionize with extended usage. The use of an AC source 17 having no DC offset tends to prevent the buildup of such a charge. In addition, and as a feature of the invention, order to prevent such a quiescent charge from building up across the liquid crystal area, an external diode 50 (FIGS. 1 and 3) may be connected to conducting layers 12,13, to thereby shunt OASLM 21.

As seen from the equivalent circuit of FIG. 3, diode 50 is connected or poled to provide a forward current direction that is the same as the forward current direction of P-I-N photodiode layer 30. As a result of the operation of the FIG. 3 series circuit 31,50,30, such a quiescent charge buildup on liquid crystal capacitor 31 is prevented.

Figure 4:
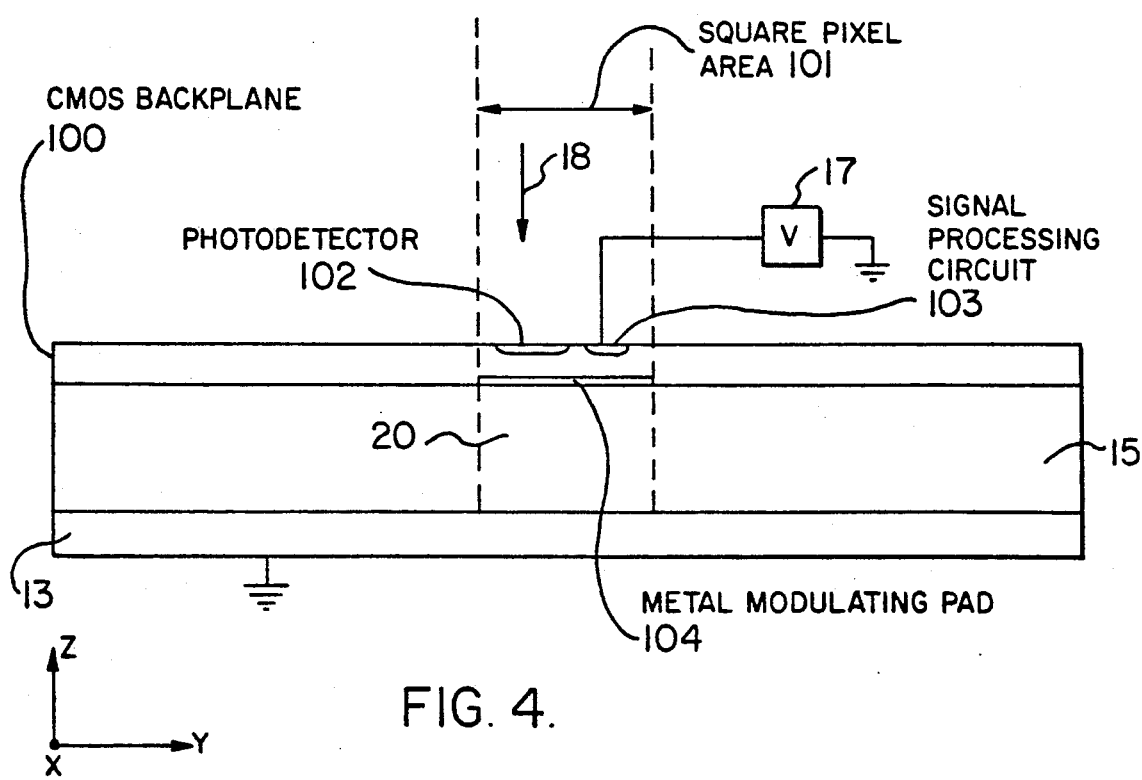
FIG. 4 is a side section view of an embodiment of the invention wherein the light sensitive member comprises an integrated circuit substrate that includes a discrete photosensor area, processing electronics, and a metal crystal modulating pad for each pixel of the OASLM, with the metal pads being in physical contact with the corresponding pixel areas of the DHFLC.

FIG. 4 is a side section view of an embodiment of the invention, much like the view of FIG. 1, wherein the OASLM's light sensitive member comprises an integrated circuit substrate member that includes, for each pixel of the OASLM, a discrete input photosensor area, a signal processing electronic circuit means for the output of the photosensor area, and a metal crystal modulating output pad, the metal pad being in physical contact with the corresponding pixel area of the DHFLC.

With reference to FIG. 1, this second embodiment of the invention can be visualized if one eliminates conductive layer 12 and photosensitive layer 14 of FIG. 1, and substitutes therefor a semiconductor integrated circuit substrate member that carries a pixel matrix pattern of light sensitive circuit elements, one such element for each pixel of the modulator, and a corresponding matrix pattern of crystal modulating pads, one such pad for each pixel of the modulator. p In FIG. 4, each of the circuit elements 102,103 is connected to a metal pad 104 whose physical X-Y position defines one pixel area 20 of liquid crystal layer 15. A voltage source such as 17 is connected to each of these pads by way of its light sensitive circuit element. Each of the pads 104 may then operate to place an electric field across its individual DHFLC pixel area, by way of the conductive film 13 that is common to all DHFLC pixel areas.

The technology whereby the semiconductor integrated circuit substrate member (sometimes called a backplane member) is manufactured is not critical to the present invention. For example, it may be formed as a CMOS VLSI device.

Writing wavefront 18 is operable to selectively activate individual ones of these circuit elements 102,103, and as a result thereof, the corresponding pixel portions of liquid crystal layer 15 are activated.

FIG. 4 is a side section view of such an embodiment of the invention wherein the light sensitive member comprises integrated circuit backplane member 100. Member 100 includes for each pixel of the OASLM, (1) a discrete photodetector or photosensor area 102, (2) processing electronics 103 connected to photodetector area 102 and operable to process the signal that is provided by photosensor 102, and (3) a metal modulating pad 103 connected to the output of processing electronics 103. For purposes of simplicity, these connections are not shown. In this figure, each OASLM pixel comprises a pixel area 101 that is generally square shaped in the X-Y plane. Metal pads 104 are in physical contact with the corresponding pixel areas 20 of DHFLC layer 15. The shape of pads 104 generally define the cross sectional shape of pixel areas 20, in this case square. It will be appreciated that elements 102, 103, 104, 20 of FIG. 4 are greatly enlarged for purposes of clarity.

A source of OASLM operating voltage 17 is connected between each of the circuits 103 and transparent conductive film 13, as is shown.

When a writing light beam activates a photosensor area 102, a signal is developed that operates to connect voltage source 17 across the corresponding pixel area 20 of DHFLC layer 15. Thus, this DHFLC pixel area is switched. A reading electromagnetic wavefront now illuminates the OASLM from the underside thereof, and is reflected with localized polarization states as is determined by the selective switching of the various pixel areas of DHFLC layer 15.

Circuit means 103 is constructed and arranged such that in the presence of writing illumination 18 on photodetector 102, a current flows to charge the corresponding pixel area of DHFLC 15. When this writing illumination is terminated, the absence of a signal from photodetector 102 operates to cause an opposite polarity current to flow, thereby operating to discharge this DHFLC pixel area.

Figure 5:
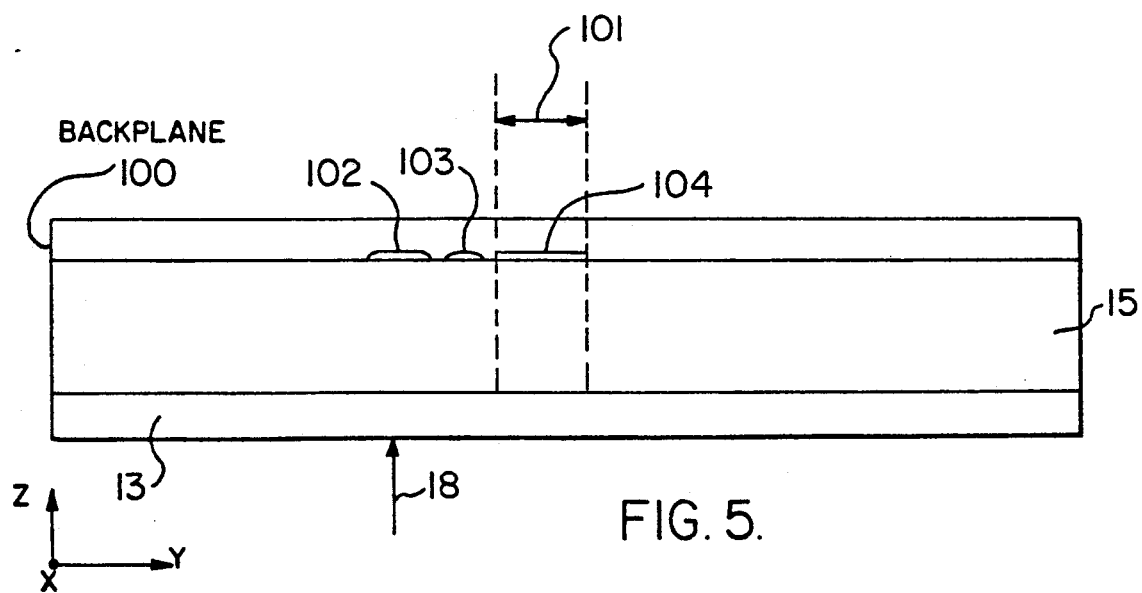
FIG. 5 is a side section view of another version of this embodiment of the invention wherein the integrated circuit fabrication has been simplified by arranging that the elements thereof are all on the same side (i.e. the liquid crystal side) of the integrated circuit substrate member.

In FIG. 4 semiconductor substrate 100 is fabricated with elements 102 and 103 on one side thereof and with elements 104 on the other side thereof. FIG. 5 is a side view of another embodiment wherein integrated circuit fabrication is been simplified by arranging that all of the elements 102, 103 and 104 are located all on the same side of integrated circuit substrate member 100. In this case write illumination 18 is directed to the OASLM from the liquid crystal side thereof.

The details of the construction and arrangement of integrated means 102, 103 and 104 are not critical to the invention, and can take a number of forms. Other forms and configurations as are apparent to those skilled in the art are to be considered as within the spirit and scope of the invention.

Figure 6:
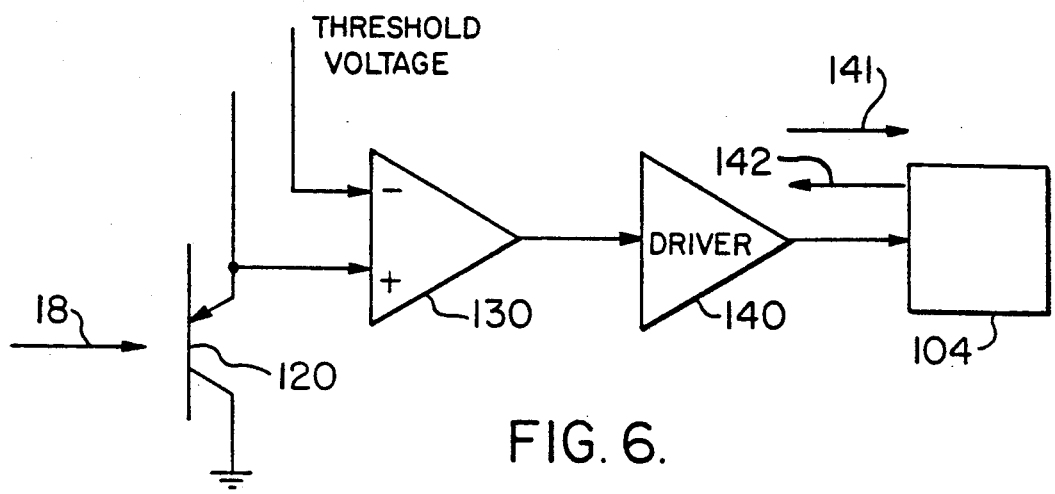
FIG. 6 is a showing of an exemplary circuit means to be used in FIGS. 4 and 5.

FIG. 6 is a showing, without limitation thereto, of a exemplary circuit means to be used as elements 103, 103 and 104 of FIGS. 4 and 5. As seen in this figure, write illumination 18 operates upon a photosensitive transistor 120, to thereby provide a signal to the noninverting input of an operational amplifier 130 when such illumination is present. The inverting input of amplifier 130 is connected to an external voltage source of reference potential, designated in the figure as a source of threshold voltage. The output of amplifier 130 is connected to a driver circuit 140, and the output of driver 140 is connected to liquid crystal modulating pad 104.

When write illumination 18 is present, a current 141 flows to charge the corresponding pixel area of DHFLC layer 15 (i.e. pixel areas 101 of FIGS. 4 and 5). Subsequently, when write illumination 18 is terminated, an opposite polarity current 142 flows, to thereby discharge (i.e. turn off) the corresponding pixel area of DHFLC layer 15.

This type of device is well suited for use as a reflective mode OASLM wherein the reading wavefront illuminates the OASLM from the underside as shown in FIGS. 4 and 5. However, it will also function as a transmission mode device wherein the reading wavefront illuminates the OASLM through semiconductor substrate 100, when the reading light source is of a wavelength that is not appreciable absorbed by substrate 100.

The present invention has been described while making reference to various embodiments thereof. It is however appreciated that those of skill in the art will readily visualize yet other embodiments of the invention upon being taught of the spirit and scope of the invention. Thus it is intended that the present invention be limited solely by the following claims.

What is claimed is:

1. A spatial light modulator operable to be written by a source of writing electromagnetic radiation and to be read by a source of reading electromagnetic radiation, the modulator comprising;

a pair of physically spaced electrically conductive films that are transparent to the writing/reading electromagnetic radiation, said conductive films being located in confronting relation to each other, an electromagnetic radiation sensitive film on one of the conductive films in confronting relation to the other of said conductive films, a distorted helix ferroelectric liquid crystal film confined between said other conductive film and said radiation sensitive film, and voltage supply means connected to said two conductive films, said voltage supply means comprising a source of AC voltage having a peak to peak magnitude of about 3 to 7 volts.

2. The light modulator of claim 1 wherein said electromagnetic radiation sensitive film comprises a photodiode film.

3. The light modulator of claim 2 including a pair of glass plates that are transparent to the writing/reading electromagnetic radiation supporting said pair of conductive films.

4. The light modulator of claim 3 wherein selected pixels of said modulator are written by a source of writing electromagnetic radiation that addresses said selected modulator pixels while impinging upon said radiation sensitive film, and wherein said modulator is read by a source of reading electromagnetic radiation that impinges upon said liquid crystal film.

5. The light modulator of claim 4 wherein said photodiode electromagnetic radiation sensitive film comprises a hydrogenated amorphous silicon (a-Si:H) P-I-N photodiode film.

6. The light modulator of claim 5 including crystal alignment means associated with said distorted helix ferroelectric liquid crystal film.

7. The spatial light modulator of claim 6 including a diode located physically external to said modulator and connected to said pair of physically spaced electrically conductive films, said diode being poled relative to said voltage supply means so as to provide an opposite direction of forward current flow as is provided by said photodiode electromagnetic radiation sensitive film.

8. An optically addressable spatial light modulator occupying a given planar pixel area, the modulator comprising;

photodiode radiation sensitive means covering the planar area of said modulator, said radiation sensitive means having first and second spaced surfaces across which a current is generated when said radiation sensitive means is subjected to a source of writing radiation, a distorted helix ferroelectric liquid crystal means having first and second surfaces, said first surface of said liquid crystal means being in physical contact with said first surface of said radiation sensitive means, and low peak to peak magnitude AC power supply circuit means connected to the second surface of said liquid crystal means to the second surface of said radiation sensitive means, said AC power supply circuit means providing a peak to peak voltage magnitude of about 2 to 7 volts.

9. The optically addressable spatial light modulator of claim 8, including first and second planar electrically conductive means, said first electrically conductive means being in physical electrical contact with the second surface of said liquid crystal means, said second electrically conductive means being in physical and electrical contact with the second surface of said radiation sensitive means, and said power supply circuit means connecting said first electrically conductive means to said second electrically conductive means in the absence of a DC offset voltage.

10. The optically addressable spatial light modulator of claim 9 wherein said modulator operates in a transmission mode, and wherein said radiation sensitive means comprises a continuous layer that covers the planar area of said modulator.

11. The optically addressable spatial light modulator of claim 10 wherein said radiation sensitive means comprises a hydrogenated amorphous silicon photodiode radiation sensitive means.

12. The optically addressable spatial light modulator of claim 11 wherein said AC power supply circuit means comprises an AC source that is connected in series to said first and second electrically conductive means in the absence of a source of DC bias voltage, said AC source having a peak to peak magnitude that is equal to or less than about 3 to 7 volts.

13. The optically addressable spatial light modulator of claim 12 wherein said AC source is a square wave AC source.

14. The spatial light modulator of claim 13 including diode means connected to shunt the second surface of said liquid crystal means to the second surface of said radiation sensitive mean, said diode means being polarity connected relative to said AC power supply circuit means so as to provide an opposite direction of forward current flow as is provided by said photodiode radiation sensitive means.

15. The spatial light modulator of claim 8 for operating in a reflection mode of operation and having mirror means located at intermediate said first surface of said liquid crystal means and said first surface of said radiation sensitive means.

16. The spatial light modulator of claim 15 wherein said mirror means comprises a plurality of electrically conductive mirror elements, one for each pixel of said pixel area.

17. The spatial light modulator of claim 8 wherein said radiation sensitive means comprises a hydrogenated amorphous silicon photodiode radiation sensitive means.

18. The spatial light modulator of claim 17 wherein said hydrogenated amorphous silicon photodiode radiation sensitive means comprises a plurality of individual photodiode radiation sensitive areas, one area for each pixel of said pixel area.

19. A low voltage optically addressable spatial light modulator occupying a multi-PEL matrix area, the modulator comprising;

two spaced radiation transparent layers of electrically conducting material covering said multi-PEL matrix area, a distorted helix ferroelectric liquid crystal layer and a radiation sensitive layer sandwiched between said two conducting layers and covering said multi-PEL matrix area, and low voltage electrical conductor means interconnecting said two conducting layers, said conductor means including in series therewith an AC power source for said modulator, said AC power source having a peak to peak magnitude equal to or less than about 3 to 7 volts, such that selective radiation activation of PEL areas within said radiation sensitive layer causes positionally corresponding PEL areas of said liquid crystal layer to be charged by operation of said low voltage electrical conductor means.

20. The spatial light modulator of claim 19 wherein said radiation sensitive layer is a hydrogenated amorphous silicon (a-Si:H) P-I-N photodiode layer.

21. The spatial light modulator of claim 20 including liquid crystal alignment means associated with said ferroelectric liquid crystal layer to cause said liquid crystal layer to align itself to one crystal orientation, such that during one half cycle of said AC source in which said photodiode layer is reverse biased, and when selected PEL areas of said photodiode layer are written by write radiation during said one half cycle, said photodiode layer conducts a current that operates to charge corresponding PEL areas of said liquid crystal layer, and thereby rotate said corresponding PEL areas into another crystal orientation.

22. The spatial light modulator of claim 21 wherein during a half cycle of said AC source that is of an opposite polarity to that of said one half cycle, said photodiode layer is forward biased, and said corresponding PEL areas of said liquid crystal layer are discharged and rotate to said one crystal orientation.

23. The spatial light modulator of claim 22 including a pair of transparent glass plates individually supporting said two radiation transparent layers of transparent electrically conducting material.

24. The spatial light modulator of claim 23 including a diode located physically external to said modulator and interconnecting said two layers of electrically conducting material, said diode thereby providing a series circuit with said photodiode layer and said liquid crystal layer, and said diode being poled to provide the same direction of forward current flow in said series circuit as does said photodiode layer.

25. The spatial light modulator of claim 24 wherein said modulator operates in a transmission mode.

26. The spatial light modulator of claim 24 wherein said modulator operates in a reflective mode.

27. The spatial light modulator of claim 26 including mirror means located intermediate said distorted helix ferroelectric liquid crystal layer and said radiation sensitive layer.

28. The spatial light modulator of claim 24 wherein said electrical conductor means is absent of the presence of a source of DC offset voltage.

29. The spatial light modulator of claim 19 wherein said modulator operates in a transmission mode.

30. The spatial light modulator of claim 19 wherein said modulator operates in a reflective mode.

31. The spatial light modulator of claim 30 including mirror means located intermediate said distorted helix ferroelectric liquid crystal layer and said radiation sensitive layer.

32. An optically addressable spatial light modulator comprising:
   a planar photodiode electromagnetic radiation sensitive member having first and second surfaces,
   a planar distorted helix ferroelectric liquid crystal member having a first surface in physical contact with the second surface of said radiation sensitive member,
   voltage supply means having a peak to peak magnitude of about 3 to 7 volts, and
   circuit means connecting said voltage supply means to the second surface of said liquid crystal member and to the first surface of said radiation sensitive member.

33. The spatial light modulator of claim 32 wherein said radiation sensitive layer comprises a hydrogenated amorphous silicon (a-Si:H) P-I-N photodiode layer.

34. The spatial light modulator of claim 33 including a discrete diode member located physically external to said modulator and connecting the second surface of said liquid crystal member to the first surface of said radiation sensitive member, said diode member being poled relative to said voltage supply means so as to provide an opposite direction of forward current flow as is provided by said photodiode radiation sensitive layer.

35. The spatial light modulator of claim 34 wherein said voltage supply means comprises a source of AC voltage having a peak to peak magnitude of about 3 to 7 volts in the absence of a DC source.

36. The spatial light modulator of claim 32 wherein said planar liquid crystal member defines a pixel matrix, and wherein said radiation sensitive layer comprises an integrated circuit member having a discrete photosensitive area and an associated metal pad for each individual pixel of said liquid crystal member, said metal pads being in physical contact with corresponding pixel areas of said liquid crystal member, said photosensitive areas, when activated by writing electromagnetic radiation, operating to apply a liquid crystal activating current to the corresponding pixel areas of said liquid crystal member.

37. An optically addressable spatial light modulator having a plurality of pixel areas, the modulator comprising;
   a distorted helix ferroelectric liquid crystal layer covering said modulator, and having first and second surfaces,
   a semiconductor substrate member covering said modulator, said substrate member having a plurality of pairs of light sensitive circuit means and liquid crystal modulator metal pad means, each of said plurality of metal modulator pad means being located in electrical contact with a different portion of said first surface of said liquid crystal means, and
   liquid crystal activating power supply means comprising a source of AC voltage having a peak to peak magnitude of about 3 to 7 volts connected to the second surface of said liquid crystal means and to said plurality of light sensitive circuit means.

* * * * *